(12) United States Patent
Tribelhorn et al.

(10) Patent No.: US 8,388,797 B2
(45) Date of Patent: Mar. 5, 2013

(54) PROCESS FOR BONDING REACTIVE ADHESIVES TO SUBSTRATES

(75) Inventors: Ulrich Tribelhorn, Ebikon (CH); Renate R. Herger Hassan, Obstalden (CH)

(73) Assignee: Dow Global Technologies LLC, Midland, MI (US)

( * ) Notice: Subject to any disclaimer, the term of this patent is extended or adjusted under 35 U.S.C. 154(b) by 502 days.

(21) Appl. No.: 12/549,553

(22) Filed: Aug. 28, 2009

(65) Prior Publication Data
US 2010/0059179 A1 Mar. 11, 2010

Related U.S. Application Data

(60) Provisional application No. 61/095,653, filed on Sep. 10, 2008.

(51) Int. Cl.
C09J 5/04 (2006.01)
B05D 5/10 (2006.01)
C08L 67/00 (2006.01)
C08G 18/08 (2006.01)

(52) U.S. Cl. ............ 156/314; 156/315; 427/207.1; 523/500; 524/589

(58) Field of Classification Search .......... 156/314, 156/315; 427/207.1; 523/500; 524/589
See application file for complete search history.

(56) References Cited

U.S. PATENT DOCUMENTS

| | | | |
|---|---|---|---|
| 3,647,513 A | 3/1972 | Jackson | |
| 3,971,751 A | 7/1976 | Isayama et al. | |
| 4,374,968 A * | 2/1983 | McLaughlin | 528/54 |
| 4,538,920 A | 9/1985 | Drake | |
| 4,622,369 A | 11/1986 | Chang et al. | |
| 4,645,816 A | 2/1987 | Pohl et al. | |
| 4,788,254 A | 11/1988 | Kawakubo et al. | |
| 4,837,274 A | 6/1989 | Kawakubo et al. | |
| 4,906,707 A | 3/1990 | Yukimoto et al. | |
| 4,910,279 A | 3/1990 | Gillis et al. | |
| 4,923,927 A | 5/1990 | Hirose et al. | |
| 5,011,900 A | 4/1991 | Yukimoto et al. | |
| 5,045,393 A * | 9/1991 | Kumanoya et al. | 428/353 |
| 5,063,270 A | 11/1991 | Yukimoto et al. | |
| 5,082,147 A | 1/1992 | Jacobs | |
| 5,115,086 A | 5/1992 | Hsieh | |
| 5,223,597 A | 6/1993 | Iwakiri et al. | |
| 5,238,993 A | 8/1993 | Hsieh | |
| 5,342,914 A | 8/1994 | Iwakiri et al. | |
| 5,409,995 A | 4/1995 | Iwahara et al. | |
| 5,466,727 A | 11/1995 | Hsieh | |
| 5,468,317 A | 11/1995 | Hsieh | |
| 5,541,266 A | 7/1996 | Hasegawa et al. | |
| 5,567,833 A | 10/1996 | Iwahara et al. | |
| 5,650,467 A | 7/1997 | Suzuki et al. | |
| 5,792,811 A | 8/1998 | Bhat | |
| 6,015,475 A | 1/2000 | Hsieh et al. | |
| 6,053,971 A | 4/2000 | Lin | |
| 6,512,033 B1 | 1/2003 | Wu | |
| 6,649,016 B2 | 11/2003 | Wu et al. | |
| 6,828,403 B2 | 12/2004 | Mahdi et al. | |
| 6,965,008 B2 | 11/2005 | Symietz et al. | |
| 7,345,130 B2 | 3/2008 | Zhu et al. | |
| 7,819,964 B2 | 10/2010 | Hsieh et al. | |
| 2002/0100550 A1 | 8/2002 | Mahdi et al. | |
| 2003/0084995 A1* | 5/2003 | Zhang | 156/315 |
| 2005/0126683 A1 | 6/2005 | Hsieh et al. | |
| 2006/0124225 A1 | 6/2006 | Wu et al. | |
| 2007/0037920 A1* | 2/2007 | Kulling et al. | 524/500 |
| 2008/0017296 A1 | 1/2008 | Zhu et al. | |
| 2008/0149257 A1 | 6/2008 | Tribelhorn et al. | |

FOREIGN PATENT DOCUMENTS

| | | |
|---|---|---|
| EP | 0197338 A1 | 10/1986 |
| EP | 1433802 | 6/2004 |
| GB | 2138016 A | 10/1984 |
| WO | 2004056903 | 7/2004 |
| WO | 2005019292 | 3/2005 |
| WO | 2008076146 | 6/2008 |
| WO | 2008/100801 A1 | 8/2008 |

OTHER PUBLICATIONS

German Patent No. DE19924139, Dr. Horst Hoffmann, et al., abstract translation.
Journal of the American Chemical Society, vol. 49, p. 3181 (1927), Wohler, Description of Test.
International Search Report, Application No. PCT/US2009/055303, Date Feb. 5, 2010.
International Preliminary Report on Patentability, Application No. PCT/US2009/055303, Date Dec. 8, 2010.

* cited by examiner

Primary Examiner — Michael Orlando
(74) Attorney, Agent, or Firm — Dobrusin & Thennisch PC

(57) ABSTRACT

The invention is a system, or kit, comprising i) a stable solution or dispersion of a catalyst for the curing of a reactive adhesive system; and in a separate part ii) an uncured reactive adhesive system wherein the catalyst of part i) accelerates the cure of the reactive adhesive system. The reactive adhesive system can be a one or two-part system. In another embodiment, the invention is a method of bonding a reactive adhesive to a substrate comprising: a) contacting a catalyst for the curing of the reactive adhesive in a volatile solvent with the surface of the substrate to which the adhesive will be bonded; b) allowing the volatile solvent to volatilize away; c) contacting a reactive adhesive with the surface treated in step a) and d) allowing the adhesive to cure. This process is performed in the absence of a primer and a film forming agent.

29 Claims, No Drawings

PROCESS FOR BONDING REACTIVE ADHESIVES TO SUBSTRATES

CLAIM OF PRIORITY

This application claims priority from U.S. Provisional Application Ser. No. 61/095,653 filed on, 10 Sep. 2008, incorporated herein by reference.

FIELD OF INVENTION

This invention relates to a method of improving the adhesion and speed of link up of a reactive adhesive to a substrate.

BACKGROUND OF INVENTION

Reactive adhesives, for example, isocyanate functional (polyurethane or urea forming), epoxy based and silanol condensation based adhesives, are used for bonding a wide variety of substrates together. Such adhesives are utilized in construction, vehicle manufacture, assembly of electronic subassemblies and devices, toys and the like. Such adhesives have found widespread use because they allow for reasonable processing conditions and exhibit good adhesion to many substrates. For many substrates the processes used to assemble parts using reactive adhesives require cleaning of the substrate surface to remove contaminants, sometimes the system used to clean the surface is referred to as a wipe. In many processes a primer or activator is utilized to facilitate adhesion of the adhesive to the substrate. A primer or activator system typically contains a film forming resin, a solvent and one or more of an adhesion promoter, catalyst, curing agent or crosslinking agent. See for example DE 19924139. Primers require the formation of a film on the substrate surface which bonds to the substrate surface and to the adhesive surface. In most commercial applications, primers require a minimum amount of time between application of the primer and application of the adhesive to allow adequate film build up. If an adhesive is applied before such minimum time, the primer will not have the opportunity to form a coherent film and there is a significant risk that the primer will not bond to either of the substrate surface or the adhesive surface. Many primers are moisture cure primers which require the presence of moisture to form an adequate film. Examples of such primers are U.S. Pat. No. 5,115,086; U.S. Pat. No. 5,238,993; U.S. Pat. No. 5,466,727; U.S. Pat. No. 5,468,317; and U.S. Pat. No. 5,792,811, all incorporated herein by reference. Non-film forming solutions of adhesion promoters, often called activators, are used which may contain groups intended for reaction with the substrate and the adhesive. Examples of wipe systems include U.S. Pat. No. 6,053,971, incorporated herein by reference. Examples of such adhesion promoters useful in such systems are silanes, isocyanate containing compounds, titanates and zirconates such as disclosed in U.S. Patent Publications 2005/0126683 and 2006/0124225, all incorporated herein by reference.

One-part isocyanate functional adhesives typically contain one or more isocyanate functional materials in the form of polyisocyanates or isocyanate functional prepolymers and a catalyst for the cure of the adhesive. Typically, these adhesives cure as a result of exposure to moisture and are protected from moisture until applied to a substrate. When one-part polyurethane adhesives are used with a primer, the cure rate of the primer and the adhesive must be matched to allow the adhesive to link up to the primer. For primers which cure or form a film with exposure to moisture, the adhesive and the primer compete for moisture. With the adhesive applied over the primer, it is often difficult for moisture to diffuse to the primer and the primer may not adequately form a film. If the primer does not properly cure, the bond of the adhesive system to the substrate may not be sufficient for use.

A two-part polyisocyanate based adhesive comprises, in one part, a polyisocyanate or an isocyanate functional prepolymer and in a second part a curing agent and catalyst for the reaction of the curing agent with isocyanate groups. Further, the link up of the adhesive to the surface of the substrate or the primer needs to be matched. If the cure rate of the adhesive is significantly faster than the link up of the adhesive to the substrate surface or the primer surface, then poor adhesion to the substrate will occur and the bond of the adhesive system to the substrate may not be sufficient for use. Typically, the curing agent is a compound having on average more than one active hydrogen atom, for instance an amine or hydroxyl moiety. Examples of such systems include the adhesive systems disclosed in the commonly owned patent application titled COMPOSITION USEFUL AS AN ADHESIVE FOR INSTALLING VEHICLE WINDOWS filed in the United States on Jun. 3, 2007 having a Ser. No. 11/824,984 and filed in the PCT on Jun. 5, 2007 having a serial number PCT/US07/013; U.S. Pat. No. 6,965,008; EP 1433802 and EP 1578834, all incorporated herein by reference. The adhesive starts to cure when the two parts are contacted. Two-part adhesives have the advantage that they cure much faster than one-part adhesives. The problem with utilizing two-part adhesives with primers is that the adhesives can cure faster than the primer cures and not link up to the primer. Also, the adhesive which contains isocyanate groups can tie up moisture needed to cure the primer. Thus, the time period between primer application and application of the adhesive to the substrate needs to allow for adequate film build, otherwise the system may not completely link up and form good bonds along all of the layers of the adhesive system. Further, the link up speed needs to be matched to the adhesive cure rate. If either is too fast compared to the other, then poor adhesion to the substrate will occur and the bond of the adhesive system to the substrate may not be sufficient for use.

One-part epoxy adhesive systems comprise compounds having on average more than one epoxy (glycidyl ether group), a curing agent comprising on average more than one moiety which react with epoxy moieties, such as hydroxyl or amine moieties, and a latent curing catalyst. The latent curing catalyst typically becomes active when exposed to a defined elevated temperature. One-part epoxy adhesives require heat to cure and if not properly formulated can suffer from stability problems, i.e., can cure before applied. If the catalyst causes the reaction to proceed too rapidly, the adhesive may not link up to the substrate surface of, if used, primers applied to the surface of the substrate.

A two-part epoxy system comprises, in one part, compounds having on average one or more epoxy groups and, in another part, a curing agent for the epoxy and a catalyst (often referred to as an accelerator) for the cure of the epoxy compound. Typically, the catalyst is active at ambient temperatures and accelerates reaction when the two parts are contacted. The speed of cure can be adjusted to fit the application by choice of curing agent and/or catalyst. Nevertheless, in primered systems the adhesive cure speed, the link up speed and the open time need to be carefully controlled or link up of the adhesive to the primer system can be compromised. Activator systems do not address the need to balance the link-up reaction with the curing reaction.

Another common adhesive system comprises organic based polymers having siloxy groups with hydrolyzable groups bonded thereto, i.e., groups capable of silanol condensation. These adhesives are used to bond a variety of substrates including glass, painted substrates, metals and plastics having relatively high polarity surfaces. Such adhesives can be formulated into one or two-part adhesives. The one-part adhesives are moisture curable. The two-part adhesives contain a curing agent in the second part. Examples of such adhesive systems are disclosed in Mahdi et. al., U.S. Pat. No. 6,828,403; Wu et al., U.S. Pat. No. 6,649,016 and Zhu U.S. Patent Application 2008/0017296, incorporated herein by reference.

The use of primers in adhesive systems require process steps to apply the primer, provide two additional surfaces along which an adhesive system can fail and due to the open time requirement, add process time to manufacturing processes. In modern industrial processes, there is a need to move parts and to place loads on adhesive systems as soon as possible. Moving parts or articles bonded together with adhesives or placing a load on the adhesive bond before the system builds adequate strength can result in failure of the adhesive system thus resulting in faulty parts or articles. What is needed is a system for bonding parts using reactive adhesives which avoids these problems and which matches the cure rate of the reactive adhesive to the link up speed to the substrate or the primer system.

SUMMARY OF INVENTION

The invention is a system, or kit, comprising i) a stable solution or dispersion of a catalyst for the curing of a reactive adhesive system; and in a separate part ii) an uncured reactive adhesive system wherein the catalyst of part i) accelerates the cure of the reactive adhesive system. The reactive adhesive system can be a one or two-part system.

In another embodiment, the invention is a method of bonding a reactive adhesive to a substrate comprising:
 a) contacting a catalyst for the curing of the reactive adhesive in a volatile solvent or dispersant with the surface of the substrate to which the adhesive will be bonded;
 b) allowing the volatile solvent or dispersant to volatilize away;
 c) contacting a reactive adhesive with the surface treated in step a); and
 d) allowing the adhesive to cure. This process is performed in the absence of a primer and a primer containing film forming agent.

In another embodiment, the invention is a method of bonding two or more substrates together comprising:
 a) contacting a catalyst for the curing of a reactive adhesive in a volatile solvent or dispersant with the surface of the two or more substrates to which the adhesive will be bonded;
 b) allowing the volatile solvent or dispersant to volatilize away;
 c) contacting a reactive adhesive with the surfaces treated in step a);
 d) contacting the substrates together with the adhesive disposed between the substrates; and
 e) allowing the adhesive to cure.

The adhesive bonds directly to the substrate surface not to a separate primer layer. Preferably, once the solvent volatilizes away, the substrate has the catalyst on the surface to be bonded. In one embodiment, the catalyst is the only significant species deposited on the surface of the substrates. The solvent or dispersant, in addition, to carrying the catalyst also can function to clean the surface of the substrate. In another embodiment, the catalyst solution or dispersion contains a marker which is used to identify the application of the catalyst to the substrate surface. In one embodiment, after step b) only catalyst and marker are located on the surface of the substrate to which the adhesive is to be bonded. In another embodiment, the catalyst solution does not contain a film forming resin. In another embodiment after step b) no thermoplastic resin is located on the surface of the substrate to which the adhesive is to be bonded.

This process provides faster link of the adhesive to the substrate, allows the formulation of one-part adhesives with lower catalyst concentrations which enhances the stability of the one-part adhesive and allows for bonded parts or articles which can be handled in a shorter time period. The surface quality of the newer generation car paints has changed. Scratch and aging properties are improved, which on the other hand makes it more difficult to bond primerless to these paints, with prior art systems. Very often a sag/sliding of the adhesive, with the glass can be observed, with prior art systems. The pre-treatment according to the invention can avoid this problem and avoid the need for a paint primer.

DETAILED DESCRIPTION OF THE INVENTION

The adhesive systems used in this invention can be any reactive adhesives system which can utilize catalysts to facilitate curing of the system. "Reactive" means herein that the adhesive contains components which react to form a polymeric matrix that is set irreversibly once cured. Among preferred reactive adhesive systems are epoxy, polyisocyanate (forms polyurethane, polyurea and/or polyisocyanaurates), moisture curable silanes, heat curing polyurethane adhesives based on blocked or deactivated isocyanate groups and the like. More preferred systems are epoxy and polyisocyanate based adhesive systems. Even more preferred adhesive systems are polyisocyanate systems. The adhesive systems can be either one or two-part adhesive systems. More preferred are two-part adhesive systems.

The catalyst solution or dispersion applied to the substrate can contain any catalyst for the particular adhesive system utilized. The choice of catalyst is driven by the adhesive system. Preferred adhesive systems and catalysts for such systems are described hereinafter. Preferred catalysts are polyurethane catalysts, silanol condensation catalysts and epoxy catalysts. The solvent or dispersant can be any solvent or dispersant which forms a stable solution or dispersion of the catalyst. "Stable" means the catalyst remains in dispersion or solution until applied to the substrate surface. Preferably, the solvent or dispersant is volatile under conditions that the solution or dispersion is applied to the substrate. It is desirable for the solvent or dispersant to evaporate away or flash off as rapidly as possible after application to the substrate. Preferably, the catalyst solution or dispersion leaves only the catalyst on the surface of the substrate after the solvent or dispersant flashes off. In another embodiment, the solution or dispersant can contain a marker which allows an operator of the process to confirm that the solution or dispersion was applied. Such markers include fluorescing components which are readily available from numerous sources, for example, Aldrich Chemical Co., Milwaukee, Wis. As a specific example, the fluorescing component can be Uvitex OB brand fluorescing agent available from Ciba Specialty Chemicals, Tarrytown, N.Y. (USA). The amount of fluorescing agent added to the catalyst solution or dispersion must be sufficient so that the area of the window treated with the catalyst solution or dispersion is apparent when the window is illuminated with an ultraviolet light. In this embodiment, the marker can be left on the substrate surface along with the catalyst. Among preferred solvents or dispersants are cycloaliphatic hydrocarbons, aliphatic hydrocarbons, aromatic hydrocarbons, ketones, esters, ethers or alcohols with cycloaliphatic hydrocarbons, aliphatic hydrocarbons, aromatic hydrocarbons being more preferred. More preferred solvents or dispersants are aliphatic hydrocarbons. Among preferred aliphatic hydrocarbons are hexane, heptane and octane. Among preferred cycloaliphatic hydrocarbons is cyclohexane. Among preferred aromatic hydrocarbons are toluene and xylene.

The catalyst concentration in the solution or dispersion can be varied to fit the adhesive system, the speed of cure and link up desired. The catalyst amount is that amount sufficient to give the desired link up speed. "Link up" means to bond to the surface adjacent to the specified material. Preferably, the catalyst is present in an amount based on the weight of the solution or dispersion of about 0.01 percent by weight or greater, more preferably about 0.05 percent by weight or greater and most preferably 0.1 percent by weight or greater. Preferably, the catalyst is present in an amount based on the weight of the solution of about 20 percent by weight or less, more preferably about 5 percent by weight or less and most preferably about 2 percent by weight or less.

For polyisocyanate based adhesive systems, the catalyst can be any catalyst known to the skilled artisan for the reaction of isocyanate moieties with water or active hydrogen containing compounds. Preferably, the catalysts are not volatile at ambient conditions. Such compounds are well known in the art. Preferred catalysts comprise strong gelling or trimerization catalysts. Preferred catalysts are organometallic, metal salts, amine based catalysts, aziridine based catalysts or quaternary ammonium catalysts. Among preferred catalysts are metal alkanoates, metal acetates, metal acetylacetonates, diazabicylo compounds and tertiary amines. Preferred metals used in the metal salts include tin, bismuth, iron, potassium, sodium, zinc, and titanium, with tin, bismuth and titanium being more preferred. Preferred metal alkanoate catalysts include bismuth, zinc, potassium and sodium alkanoates, including bismuth octoate, bismuth neodecanoate, zinc octoate, potassium octoate, and sodium octoate. Preferred metal acetates include potassium acetate. Preferred metal acetyl acetylacetonates include iron acetyl acetonate, dibutyl tin diacetylacetonate and titanium acetylacetonate. Amine catalysts useful in the invention include dimorpholinodialkyl ether, di((dialkylmorpholino)alkyl)ethers, bis-(2-dimethylamino-ethyl)ether, triethylene diamine, pentamethyldiethylene triamine, N,N-dimethylcyclo-hexyl amine, N,N-dimethyl piperazine 4-methoxyethyl morpholine, N-methylmorpholine, N-ethyl morpholine, and mixtures thereof. More preferred catalysts are ammonium salts, such as DABCO™ TMR, TMR-3, TMR-4 catalysts (N-hydroxyalkylquaternary ammonium carboxylate blocked with 2 ethyl hexanoic acid in ethylene glycol) available from Air Products, DABCO™ TMR-2 and TMR-5 catalysts (N-hydroxy-alkylquaternary ammonium carboxylate blocked with formic acid in ethylene glycol) available from Air Products. Included in preferred amine catalysts are tertiary amines such as POLYCAT™ 41 catalyst (1,3,5-tris(3(dimethylamino-propyl) hexahydro-s-triazine); DABCO™ TMR-30 catalysts (tris (dimethylaminomethyl) phenol and ANCAMINE™ K-54 2,4,6-tris(dimethyl aminomethyl) phenol. Also included in useful catalysts are CURITHANE™ 52 catalyst (2-Methyl (n-methyl amino b-sodium acetate nonyl phenol)). Diazabicyclo compounds are compounds which have diazobicyclo structures. Among preferred diazabicyclo hydrocarbons include diazabicycloalkanes and diazabicyclo alkene salts. Preferred diazabicycloalkanes include diazabicyclooctane, available from Air Products under the trademark and designations, DABCO and DABCO WT. Preferred diazabicycloalkene salts include diazabicycloundecene and salts thereof. Preferred salts are in the phenolate, ethylhexoate, oleate and formate salt forms. Such catalysts are available from Air Products under the trademark and designations, POLYCAT SA 1, POLYCAT SA 1/10, POLYCT SA 102 and POLYCAT SA 610. Included in preferred diazabicyclo compounds are POLYCAT DBU catalyst (1,8 diaza bicyclo 5,4,0 undecene 7); POLYCAT SA-102 catalyst (1,8 diaza bicyclo 5,4,0 undecene 7 blocked with 2-ethylhexanoic acid); POLYCAT SA-1 catalyst (62 percent 1,8 diaza bicyclo 5,4,0 undecene 7 blocked with phenolic acid, 38 percent). Organometallic compounds such as organotin compounds are less preferred due to industrial hygiene and technical reasons. If used in the process, the bonds formed are subject to breaking with exposure to heat and moisture.

For epoxy based adhesives, useful catalysts (accelerators) known in the art are used to increase the cure rate of the epoxy adhesive. Such catalysts include compounds that can act as a curative when used alone, but when combined with a different class of curatives, will accelerate the curing of the epoxy adhesive composition. Such catalysts may be one or more of a urea derivative, tertiary amine, substituted phenol or imidazole derivative. Examples of useful catalysts include phenolic compounds, such as 2,4,6-tris(dimethyl amino methyl) phenol, tertiary amines such as benzyl dimethyl amine and piperidine, substituted imidazoles such as n-aryl imidazoles and n-alkyl imidazoles, substituted ureas such as monuron, diuron, phenuron and chlorotoluron, and calcium trifluoromethylsulfonate. These accelerators may be used alone or in combination together to accelerate the cure of an epoxy adhesive composition. These catalysts are used to promote the adhesion of one or two-part adhesive systems formulated by conventional means to substrate surfaces.

In the embodiment, wherein the reactive adhesive system comprises an organic polymer having hydrolyzable siloxane (silane) groups, the catalyst utilized comprises any catalyst known to those skilled in the art for silanol condensation. The preferred catalysts which catalyze the silanol condensation reaction comprise tin catalysts, titanates and titanium chelates, organometallic compounds, am inoalkyl-substituted alkoxysilanes, amine compounds and salts thereof, alkali metal salts of lower fatty acids, dialkylhydroxylamines and guanidyl-containing silanes or siloxanes well-known in the art as being useful for the silanol condensation reaction. One class of preferred organometallic compounds include tin compounds such as dialkyltin carboxylates (dialkyltin (IV) salts of organic carboxylates), tin ester compounds such as tin dioctoate; and dialkyltin alcoholates, such as a dialkyltindialkenedione (which includes the dialkyltinbisacetylacetonates). The preferred organometallic catalysts are the dialkyltin alcoholates, with dialkyltin diacetylacetonates being most preferred. Among preferred dialkyltin carboxylates are dibutyltin diacetate, dimethyltin dilaurate, dibutyltin dilaurate, dibutyltin maleate, dibutyltin dioctoate or dioctyltin diacetate, and the reaction product of dialkyltin oxide and phthalic acid esters. Dialkyltin alcoholates include the reaction products of dialkyltin oxides and alkanediones, such as dialkyltin diacetyl acetonates, such as dibutyltin diacetylacetonate (also commonly referred to as dibutyltin acetylacetonate). Among preferred dialkyltin carboxylates are adducts of dibutyltin oxide and phthalate esters available from Witco Corporation under the designation FOMREZ™ SUL-11A, dimethyltin dicarboxylate available from Witco Corporation under the designation FOMREZ™ UL-28, dibutyltin dilaurate available from Air Products under the designation T-12 and from Witco Corporation under the designation FOMREZ™ SUL-4 and dibutyltin diacetate available from Air Products under the designation DABCO™ T-1 and from Witco Corporation under the designation FOMREZ™ UL-1. Preferred organometallic compounds include zinc naphthenate, zinc stearate, zinc 2-ethyloctoate, iron 2-ethylhexoate, cobalt 2-ethylhexoate, manganese 2-ethylhexoate and cobalt naphthenate. Catalysts which undergo hydrolytic disassociation at a faster rate are preferred. Preferred titanates and titanium chelates include tetraisopropoxytitanium, tetra-n-butoxytitanium, tetrakis(2-ethylhexoxy)titanium, dipropoxybis(acetylacetonato)titanium, and titanium isopropoxyoctylene glycol. Preferred aminoalkyl-substituted alkoxysilanes include 3-aminopropyltriethoxysilane and N-(β-aminoethyl)-γ-aminopropyl-trimethoxysilane. Preferred amine compounds and salts thereof include hexylamine, dodecylamine phosphate, tetramethylguanidine and diazabicyclononane. Preferred quaternary ammonium salts include benzyltriethylammonium acetate. Preferred alkali metal salts of lower fatty acids include potassium acetate, sodium acetate and lithium oxalate preferred dialkylhydroxylamines include dimethylhydroxylamine and diethylhydroxylamine. Preferred guanidyl-containing silanes or siloxanes include tetramethylguanidylpropyltrimethoxysilane, tetramethylguanidylpropylmethyl-dimethoxysilane and tetramethylguanidyl-propyltris(trimethylsiloxy)silane. Of these, preferred are the amine compounds such as tetramethylguanidine and diazabicyclononane, and the guanidyl-containing silanes or siloxanes such as tetramethylguanidylpropyltrimethoxysilane, tetramethylguanidyl-propylmethyl-dimethoxysilane and tetramethylguanidylpropyl-tris(trimethylsiloxy)silane. The tin and titanate compounds are more preferred. The most preferred catalyst is dibutyltin bisacetylacetonate (dibutyltin dipentenedione) available from Nitto Kasei Co. Ltd. under the designation NEOSTANN™ U-220. These catalysts may be used alone or in admixture of two or more.

Curable epoxy adhesive compositions generally comprise: (a) an epoxy resin; (b) a curing agent for the epoxy resin; and (c) a catalyst (accelerator) for the cure of the epoxy resin. The epoxy adhesives may be formulated as one-part heat cure adhesives with the curative included in a latent form or as two-part adhesives with an epoxy resin component and a hardener component including the curative. The system and process of the invention for adhesion promotion uses a solution or stable dispersion of an accelerator or catalyst for the epoxy cure, whether or not the epoxy adhesive comprises a catalyst. Epoxy resins useful in the adhesive composition of the present invention can be any organic compound having at least one epoxy ring that is polymerizable by ring opening. Preferred are organic compounds having an average epoxy functionality greater than one, and preferably at least two. The epoxides can be monomeric or polymeric, and aliphatic, cycloaliphatic, heterocyclic, aromatic, or mixtures thereof. The more preferred epoxides are aromatic and contain more than 1.5 epoxy groups per molecule and most preferably more than 2 epoxy groups per molecule. Preferable epoxy resins have a molecular weight of about 150 to 10,000 and preferably from about 300 to 1,000. Preferable epoxy resins include linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendant epoxy groups (e.g., a glycidyl methacrylate polymer or copolymer), and mixtures thereof. Preferred are aromatic glycidyl ethers such as those prepared by reacting a polyhydric phenol with an excess of epichlorohydrin. Examples of useful phenols include resorcinol, catechol, hydroquinone, and the polynuclear phenols including p,p'-dihydroxydibenzyl, p,p'-dihydroxydiphenyl, p,p'-dihydroxydiphenyl sulfone, p,p'-dihydroxybenzophenone, 2,2'-dihydroxy-1,1-dinaphthylmethane and the 2,2',2,3',2,4',3,3',3,4' and 4,4' isomers of dihydroxydiphenylmethane, dihydroxydiphenyldimethylmethane, dihydroxydiphenyl-ethylmethylmethane, dihydroxydiphenylmethylpropylmethane, dihydroxydiphenyl-ethylphenylmethane, dihydroxydiphenylpropylphenylmethane, dihydroxydiphenylbutyl-phenylmethane, dihydroxydiphenyltolylmethane, dihydroxydiphenyltolylmethylmethane, dihydroxydiphenyldicyclohexylmethane, and dihydroxydiphenylcyclohexane. Also preferred are polyhydric phenolic formaldehyde condensation products as well as polyglycidyl ethers that contain as reactive groups only epoxy groups or hydroxy groups. Useful materials include diglycidyl ethers of bisphenol A and of novolac resins, such as described in "Handbook of Epoxy Resins" by Lee and Neville, McGraw-Hill Book Co., New York (1967), incorporated herein by reference. Epoxides with flexibilized backbones are also useful. Preferred materials include diglycidyl ethers of bisphenol A and diglycidyl ethers of bisphenol F, and most preferably diglycidyl ethers of bisphenol A, because of the desirable structural adhesive properties that these materials attain upon curing. Examples of commercially available epoxides useful in the invention include diglycidyl ethers of bisphenol A (e.g., those available under the trademarks EPON 828, EPON 1001, and EPONEX 1510 from Shell Chemical Company, and DER-331, DER-332, and DER-334 available from The Dow Chemical Company); diglycidyl ethers of bisphenol F (e.g., EPICLON™ 830 available from Dai Nippon Ink and Chemicals Inc.); silicone resins containing diglycidyl epoxy functionality; flame retardant epoxy resins (e.g., DER™ 580, a brominated bisphenol type epoxy resin available from The Dow Chemical Company; and 1,4-butanediol diglycidyl ethers.

The epoxy adhesive composition may include a toughening agent well known in the art. In some cases, reactive diluents may be added to control the flow characteristics of the adhesive composition. Suitable diluents have at least one reactive terminal end portion and preferably, a saturated or unsaturated cyclic backbone and are well known in the art. Various other adjuvants can be added to the epoxy based adhesives composition to enhance properties of the composition before and after curing. Included among useful adjuvants are nonreactive diluents; plasticizers such as conventional phosphates and phthalates; flame retardants such as borates, metaborates, aluminum hydroxide, magnesium hydroxide, and bromine compounds; thixotropic agents such as fumed silica to provide flow control; pigments to enhance color tones such as ferric oxide, brick dust, carbon black, and titanium dioxide; fillers such as talc, silica, magnesium, calcium sulfate, beryllium aluminum silicate; clays such as bentonite; glass and ceramic beads and bubbles; compounds imparting X-ray opacity, such as barium metaborate; and reinforcing materials, such as woven and nonwoven webs of organic and inorganic fibers such as polyester, polyimide, glass fibers, and ceramic fibers. Dispersing agents and wetting agents, such as silanes, can also be added so long as they do not interfere with the curing reaction of the epoxy adhesive composition. The adjuvants can be added in an amount effective for the intended purpose.

The epoxy adhesive compositions may be formulated in a variety of ways, including one-part and two-part adhesive systems. By providing a two-part composition, with the two parts being combined prior to use of the composition, desirable shelf-life or pot-life of the composition is obtained. For two-part adhesive compositions, the curing can be effected at room temperature for about 24 hours. To affect faster curing heating up to 120° C. may be utilized. In some applications, it is desirable to select the amounts and the distribution of the ingredients in each part to provide viscosity control and better mixing of the two parts. For example, the fillers can be divided so that each part contains a portion of the fillers used.

One-part epoxy compositions can be cured by any means which allow sufficient heat to start the curing reaction. The means of curing can include conventional ovens, induction heating, infrared radiation, microwave radiation, immersion into liquid baths, or any combination thereof. Curing may be achieved in several stages, e.g., induction curing for 30 seconds, and oven curing at about 120° C. or greater and preferably at about 180° C. The curing time will depend upon the particular process for curing. Induction heating times typically range from about 1 to 60 seconds. Oven curing times can range from about 0.1 to about 2 hours.

The epoxy adhesive compositions are especially useful for bonding metal to metal and plastic to metal, although it can be used for bonding plastic surfaces, such as polyester based sheet molding compounds. Examples of metal surfaces include steel, titanium, oily steel, aluminum, and magnesium. Plastic surfaces include sheet molding compounds, glass fiber reinforced epoxy resins, polycarbonate, polyester, polyurethane, acrylonitrile butadiene styrene, and urea formaldehyde. The epoxy adhesive can be used in assembling parts such as for automobiles, aircraft, refrigeration units, etc.

Isocyanate based (polyurethane or polyurea forming) adhesive systems comprise an isocyanate functional component. An isocyanate functional component contains one or more compounds having on average more than one isocyanate functional group per molecule. The isocyanate functional compound can be any compound which contains on average more than one isocyanate moiety. The isocyanate functional compound can be in the form of an isocyanate functional prepolymer or in the form of a monomer or oligomer having on average greater than 1 isocyanate group, and preferably 2 or more isocyanate groups. The isocyanate prepolymer can by any prepolymer prepared by reaction of an isocyanate functional compound with one or more compounds having on average more than one isocyanate reactive functional groups, such as hydroxyl, amine, thiol, carboxyl and the like under conditions such that the prepolymer prepared have on average more than one isocyanate moiety (group) per molecule. Polyisocyanate based systems can be one part or two-part systems. In a one-part system the isocyanate functional component further comprises a catalyst and other components as described hereinafter. The one component systems typically cure by moisture curing. Once formulated the one-part adhesives are packaged in air and moisture proof containers to prevent curing before application.

In another embodiment, the adhesive system used in the invention is a two-part polyisocyanate containing adhesive system. The two parts are reactive with one another and when contacted have adhesive properties and undergo a curing reaction wherein the composition is capable of bonding substrates together. One part of the composition comprises, or contains, an isocyanate functional component. This is typically referred to as the resin side or A side. The other component of the composition is an isocyanate reactive component which comprises, or contains, one or more compounds, oligomers or prepolymers having on average more than one group reactive with isocyanate moieties as described herein. The second part is commonly known as the curative or B side. Compounds having on average one or more isocyanate reactive groups can be prepolymers or can be small chain compounds such as difunctional chain extenders or polyfunctional crosslinking agents known in the art. Typically, the chain extenders and crosslinking agents have a molecular weight of about 250 Daltons or less. A catalyst as described hereinbefore may be utilized in the curative side. The reaction product is a cured product which is capable of bonding certain substrates together.

Preferable polyisocyanates for use in this invention include aliphatic, cycloaliphatic, araliphatic, heterocyclic or aromatic polyisocyanates, or mixtures thereof. Preferably, the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionalities may also be used, but may cause excessive crosslinking, and result in a composition which is too viscous to handle and apply easily, and can cause the cured composition to be too brittle. Preferably, the equivalent weight of the polyisocyanate is at least about 100, more preferably at least about 110, and is most preferably at least about 120; and is preferably no greater than about 300, more preferably no greater than about 250, and is most preferably no greater than about 200. Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivates thereof. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocyclohexyl)methane, and trimethyl hexamethylene diisocyanate. The most preferred isocyanate is diphenylmethane diisocyanate.

The term "isocyanate-reactive compound" as used herein includes any organic compound having at least two isocyanate-reactive moieties, such as a compound containing an active hydrogen moiety, or an imino-functional compound. For the purposes of this invention, an active hydrogen containing moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate reactive compound is a polyol or a polyamine, and is more preferably a polyether polyol.

Preferable polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers, polymer polyols (dispersions of vinyl polymers in such polyols, commonly referred to as copolymer polyols) and mixtures thereof. Preferably, the isocyanate-reactive compound has a functionality of at least about 1.5, more preferably at least about 1.8, and is most preferably at least about 2.0; and is preferably no greater than about 4.0, more preferably no greater than about 3.5, and is most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500.

The isocyanate functional prepolymers for use in the isocyanate functional adhesive systems preferably exhibit an average isocyanate functionality of at least about 2.0 and a molecular weight of at least about 500 and more preferably about 1,000. Preferably, the average isocyanate functionality of the prepolymer is at least about 2.0, and is more preferably at least about 2.2. Preferably, the isocyanate functionality is no greater than about 4.0, more preferably, no greater than about 3.5 and most preferably, no greater than about 3.0. Preferably, the weight average molecular weight of the prepolymer is at least about 2,500, and is more preferably at least about 3,000; and is preferably no greater than about 40,000, even more preferably, no greater than about 20,000, and is most preferably no greater than about 10,000. The prepolymer may be prepared by any suitable method, such as by reacting compounds having two or more groups reactive with isocyanate groups, such as the polyols or polyamines, with an excess over stoichiometry of a polyisocyanate under reaction conditions sufficient to form the corresponding prepolymer. The prepolymer may be prepared by any suitable method, such as bulk polymerization and solution polymerization. The reaction to prepare the prepolymer is carried out under anhydrous conditions, preferably under an inert atmosphere, such as a nitrogen blanket, to prevent cross-linking of the isocyanate groups by atmospheric moisture. The reaction is catalyzed by a catalyst for the reaction of isocyanate groups with isocyanate reactive groups. Examples of such include the stannous salts of carboxylic acids, such as stannous octoate, stannous oleate, stannous acetate, and stannous laurate; dialkyltin dicarboxylates, such as dibutyltin dilaurate and dibutyltin diacetate, tertiary amines and tin mercaptides. Preferably, the reaction to prepare the prepolymer is catalyzed by stannous octoate. The amount of catalyst employed is generally between about 0.005 and about 5 percent by weight of the mixture catalyzed, depending on the nature of the isocyanate. The reaction is preferably carried out at a temperature between about 0° C. and about 150° C., more preferably between about 25° C. and about 80° C., until the residual isocyanate content determined by titration of a sample is very close to the desired theoretical value. For two-part isocyanate based adhesive systems, the isocyanate content in the prepolymers is preferably in the range of about 6 percent to about 35 percent by weight, more preferably in the range of about 8 percent to about 30 percent by weight and most preferably in the range of about 10 percent to about 25 percent by weight. For one-part moisture curable systems, the isocyanate content in the prepolymers is preferably in the range of about 0.1 percent to about 10 percent, more preferably in the range of about 1.5 percent to about 5.0 percent and most preferably in the range of about 1.8 percent to about 3.0 percent.

The isocyanate functional component is present in the adhesive system in a sufficient amount to form a cured component when exposed to curing conditions. In two-part compositions, the isocyanate functional component when combined with isocyanate reactive compounds is capable of bonding substrates together in a manner that the substrates remain bound together when exposed to temperatures of about −30° C. to about 100° C. for long periods of time, such as 10 years; and up to temperatures of about 180° C. for short periods of up to 30 minutes.

The isocyanate functional adhesive compositions useful in the invention may further comprise a polyfunctional isocyanate for the purpose of improving the modulus in the cured form. "Polyfunctional" as used in the context of the isocyanates refers to isocyanates having a functionality of 2.2 or greater. The polyisocyanates can be any monomeric, oligomeric or polymeric isocyanate having a nominal functionality of about 2.2 or greater. More preferably, the polyfunctional isocyanate has a nominal functionality of about 2.7 or greater. Preferably, the polyfunctional isocyanate has a nominal functionality of about 4 or less and most preferably about 3.2 or less. The polyfunctional isocyanate can be any isocyanate which is reactive with the isocyanate functional prepolymers and/or isocyanate reactive compound, oligomers or prepolymers used in the composition and which improves the modulus of the cured composition. The polyfunctional isocyanates can be monomeric; trimers, isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, available from Bayer under the trademark and designations DESMODUR N3300 and N-100, and polymeric isocyanates such as polymeric MDI (methylene diphenyl diisocyanates) such as those marketed by The Dow Chemical Company under the trademark of PAPI, including PAPI 20 polymeric isocyanate. The polyfunctional isocyanates are present in a sufficient amount to impact the modulus of the cured compositions of the invention. If too much is used, the cure rate of the composition is unacceptably slowed down. If too little is used, the desired modulus levels are not achievable. The polyfunctional isocyanate is preferably present in an amount of about 0.5 percent by weight or greater based on the weight of the composition, more preferably about 1.0 percent by weight or greater and most preferably about 1.4 percent by weight or greater. The polyfunctional isocyanate is preferably present in an amount of about 8 percent by weight or less, based on the weight of the composition, more preferably about 5 percent by weight or less and most preferably about 2.5 percent by weight or less. The polyfunctional isocyanates can be utilized in one part and two-part adhesive compositions. In two-part compositions, they are preferably located in the part containing the isocyanate functional component which is preferably in the form of an isocyanate functional prepolymer.

The isocyanate functional adhesive systems further comprise one or more catalysts for the reaction of isocyanate functional groups with isocyanate reactive groups wherein the catalyst may be located in the isocyanate functional group containing component or the isocyanate reactive component. Preferably, for two-part adhesive systems, the catalyst is located in the isocyanate reactive component to improve the stability of the two component system. The catalyst can be any catalyst known to the skilled artisan for the reaction of isocyanate groups with active hydrogen containing compounds. Among preferred catalysts are organotin compounds, metal alkanoates, tertiary amines and diazabicyclo compounds. The catalyst is utilized in a sufficient amount to cause the isocyanate groups to react with the isocyanate reactive groups at a reasonable rate. The amount of catalyst utilized depends on the choice of catalyst and the reaction rate desired. Preferably, the catalyst will be utilized in an amount of about 0.006 percent by weight or greater based on the adhesive system, more preferably about 0.01 percent by weight or greater and most preferably about 0.02 percent by weight or greater. Preferably, the catalyst will be utilized in an amount of about 5.0 percent by weight or less based on the adhesive system, more preferably about 2.0 percent by weight or less and most preferably about 1.0 percent by weight or less. Included in the useful organotin catalysts are compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^1OC(O))_2$—Sn—$(R^1)_2$ wherein $R^1$ is independently in each occurrence a $C_{1-10}$ alkyl, preferably a $C_{1-3}$ alkyl and most preferably a methyl. Dialkyltin dicarboxylates with lower total carbon atoms are preferred as they are more active catalysts in the compositions used in the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organotin or metal alkanoate catalyst is preferably present in an amount of about 0.006 percent or greater based on the weight of the compositions and more preferably 0.012 percent or greater. The organotin or metal alkanoate catalyst is preferably present in an amount of about 1.0 parts by weight or less based on the weight of the composition, more preferably about 0.5 percent by weight or less and most preferably about 0.1 percent by weight or less. Among preferred tertiary amines are dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine, 4-methoxyethyl morpholine, N-methylmorpholine, N-ethyl morpholine, and mixtures thereof. More preferred tertiary amines include dimorpholinodiethyl ether or (di-(2-(3,5-dimethyl-morpholino)ethyl)ether). Tertiary amines are preferably employed in an amount, based on the weight of the composition, of about 0.01 percent by weight or greater based on the adhesive system, more preferably about 0.05 percent by weight or greater, even more preferably about 0.1 percent by weight or greater and most preferably about 0.2 percent by weight or greater and preferably about 2.0 percent by weight or less, more preferably about 1.75 percent by weight or less, even more preferably about 1.0 percent by weight or less and most preferably about 0.4 percent by weight or less.

Diazabicyclo compounds useful in the isocyanate functional adhesive systems are compounds which have diazobicyclo structures. It is preferable to use diazabicyclo compounds in two-part systems. Among preferred diazabicyclo hydrocarbons include diazabicycloalkanes and diazabicyclo alkene salts. In some embodiments, it is preferable that the catalyst comprises one or more diazabicycloalkanes and one or more diazabicyclo alkene salts. Where both classes of compounds are present, the mole ratio of the one or more diazabicycloalkanes to the one or more diazabicycloalkene salts is preferably about 1:9 or greater; more preferably about 2:8 or greater; and most preferably about 4:6 or greater. Where both classes of compounds are present, the mole ratio of the one or more diazabicycloalkanes to the one or more diazabicycloalkene salts is preferably about 9:1 or less; more preferably about 8:2 or less; and most preferably about 6:4 or less. Preferred diazabicycloalkanes include diazabicyclooctane, available from Air Products under the trademark and designations, DABCO, DABCO WT, DABCO DC 1, DABCO DC 2, and DABCO DC 21. Preferred diazabicycloalkene salts include diazabicycloundecene in the phenolate, ethylhexoate, oleate and formiate salt forms, available from Air Products under the trademark and designations, POLYCAT SA 1, POLYCAT SA 1/10, POLYCAT SA 102 and POLYCAT SA 610. In a preferred embodiment, one or more diazabicyclo compounds and one or more organometallic and/or tertiary amine catalysts are present in the adhesive system. The diazabicyclo compounds are present in a sufficient amount such that the compositions exhibit an acceptable cure rate as defined herein. The diazabicyclo compounds preferably are present in the compositions of the invention in an amount of about 0.01 percent by weight or greater, more preferably about 0.02 percent by weight or greater. Preferably, the diazabicyclo compounds are present in the compositions of the invention in an amount of about 5 percent by weight or less, more preferably about 1 percent by weight or less and most preferably about 0.5 percent by weight or less.

The isocyanate functional adhesive compositions may further comprise one or more low molecular weight compounds having two or more isocyanate reactive groups and a hydrocarbon backbone wherein the backbone may further comprise one or more heteroatoms. It is advantageous to use such low molecular weight compounds in two-pan compositions. Such low molecular weight compounds may be compounds known in the art as chain extenders, such compounds are difunctional. Such low molecular weight compounds may be compounds also known in the art as crosslinkers, such compounds have, on average, greater than two active hydrogen groups per compound. The heteroatoms in the backbone can be oxygen, sulfur, nitrogen or a mixture thereof, wherein oxygen, nitrogen or a mixture thereof is more preferred and oxygen is most preferred. Preferably, the molecular weight of the low molecular weight compound is about 120 or less and more preferably about 100 or less. Preferably, the low molecular weight compound comprises one or more multifunctional alcohols, multifunctional alkanol amines, one or more adducts of multifunctional alcohol and an alkylene oxide, one or more adducts of a multifunctional alkanol amine and an alkylene oxide or a mixture thereof. Among preferred multifunctional alcohols and multifunctional alkanol amines are ethane diol, propane diol, butane diol, hexane diol, heptane diol, octane diol, glycerine, trimethylol propane, pentaerythritol, neopentyl glycol, ethanol amines (diethanol amine, triethanol amine) and propanol amines (di-isopropanol amine, tri-isopropanol amine) and the like. Blends of various low molecular weight compounds may be used. The low molecular weight compound is used in a sufficient amount to obtain the desired G-Modulus (E-Modulus). In two-part adhesive compositions, the low molecular compound may be located in the resin side, the curative side or both. Preferably, the low molecular weight compound is located in the curative side. Preferably, the low molecular weight compound is present in adhesive composition in an amount of about 2 percent by weight or greater, more preferably about 2.5 percent by weight or greater and most preferably about 3.0 percent by weight or greater. Preferably, the low molecular weight compound is present in the adhesive composition in an amount of about 10 percent by weight or less, more preferably about 8 percent by weight or less and most preferably about 6 percent by weight or less.

In a two-part isocyanate functional adhesive system, the curative part may further comprise polyoxyalkylene polyamine having 2 or greater amines per polyamine. Preferably, the polyoxyalkylene polyamine has 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™

D-T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the adhesive system in an amount of about 0.2 percent by weight or greater, more preferably about 0.3 percent by weight or greater and most preferably about 0.5 percent by weight or greater. Preferably, the polyoxyalkylene polyamine is present in the adhesive system in an amount of about 6 percent by weight or less, more preferably about 4 percent by weight or less and most preferably about 2 percent by weight or less.

The two parts of the adhesive system are preferably combined such that the equivalents of isocyanate groups are greater than the equivalents of the isocyanate reactive groups. More preferably, the equivalents ratio of isocyanate groups to equivalents of isocyanate reactive groups is greater than about 1.0:1.0, even more preferably about 1.05:1.0 or greater and most preferably about 1.10:1.0 or greater. More preferably, the equivalents ratio of isocyanate groups to isocyanate reactive groups is about 2.0:1.0 or less, and most preferably about 1.40:1.0 or less.

One-part polyisocyanate functional adhesive systems and either or both of the resin part and the curative part for two-part isocyanate functional systems may contain plasticizers, fillers, pigments, stabilizers and other additives commonly present in curable polyurethane forming adhesives. By the addition of such materials, physical properties such as rheology, flow rates and the like can be modified. However, to prevent premature hydrolysis of the moisture sensitive groups of the isocyanate functional component, fillers should be thoroughly dried before admixture therewith. The compositions of the invention may include ultraviolet stabilizers and antioxidants and the like.

Included among useful fillers are clays, alumina, limestone, talc, calcium carbonate and expanded perlites. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably, the clay is admixed in the form of pulverized powder, spray-dried beads or finely ground particles. Clays may be used in an amount of about 0 percent by weight or greater of the adhesive system, more preferably about 5 percent by weight or greater and even more preferably about 10 percent by weight or greater. Preferably, the clays are used in an amount of about 70 percent by weight or less of the adhesive system and more preferably about 60 percent by weight or less.

Plasticizers are included so as to modify the rheological properties to a desired consistency. Such materials should be free of water, inert to isocyanate groups and compatible with the polymers present. Suitable plasticizers are well known in the art and preferable plasticizers include alkyl phthalates, such as diisononylphthalate or diisodecylphthalate, partially hydrogenated terpenes, trioctyl phosphate, toluene-sulfamide, esters of alkylsulfonic acid, adipic acid esters, castor oil, toluene and alkyl naphthalenes. The amount of plasticizer in each part of the curable composition is that amount which gives the desired rheological properties. The amounts disclosed herein include those amounts added during preparation of the isocyanate containing prepolymer and during compounding of the curable composition. Preferably, plasticizers are used in the adhesive system in an amount of about 0 percent by weight or greater based on the weight of the adhesive system, more preferably about 5 percent by weight or greater and most preferably about 10 percent by weight or greater. The plasticizer is preferably used in an amount of about 45 percent by weight or less based on the weight of the adhesive system and more preferably about 40 percent by weight or less.

The adhesives used in this invention may further comprise stabilizers, which function to protect the adhesive composition from moisture, thereby inhibiting advancement and preventing premature crosslinking of the isocyanates in the curable formulation. Stabilizers known to the skilled artisan for isocyanate functional adhesive systems may be used herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 percent by weight or greater based on the total weight of the adhesive system, preferably about 0.5 percent by weight or greater and more preferably about 0.8 percent by weight or greater. Such stabilizers are used in an amount of about 5.0 percent by weight or less based on the weight of the adhesive system, more preferably about 2.0 percent by weight or less and most preferably about 1.4 percent by weight or less.

The adhesives useful in this invention may further comprise an adhesion promoter, such as those disclosed in Mahdi, U.S. Patent Publication 2002/0100550 paragraphs 0055 to 0065 and Hsieh, U.S. Pat. No. 6,015,475 column 5, line 27 to column 6, line 41, incorporated herein by reference. The amounts of such adhesion promoters useful are also disclosed in these references and incorporated herein by reference. In another embodiment, the adhesive system may comprise both isocyanate functional groups and hydrolyzable siloxane groups. Such adhesive systems can be prepared by blending prepolymers having isocyanate functional groups and prepolymers containing hydrolyzable siloxane functional groups, such as disclosed in Zhu, U.S. Pat. No. 7,345,130, incorporated herein by reference, or by forming prepolymers having both isocyanate and hydrolyzable siloxane functional groups as disclosed in Hsieh, U.S. Pat. No. 6,015,475 in the passages cited above.

The one-part isocyanate functional and hydrolyzable siloxane functional adhesives useful in this invention may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydrophilic materials are pyrrolidones such as 1 methyl-2-pyrrolidone (or N-methylpyrrolidone). Another class of hydrophilic materials are high ethylene oxide containing polyether polyols or catalytically active polyols containing amine groups, which can be present independently or incorporated into the isocyanate functional and/or hydrolyzable siloxane functional prepolymers. The hydrophilic material is preferably present in an amount of about 0.1 percent by weight or greater based on the weight of the adhesive system, more preferably about 0.3 percent by weight or greater, and preferably about 1.0 percent by weight or less and more preferably about 0.6 percent by weight or less. Optionally, the curable composition may further comprise a thixotrope (rheological additive). Such thixotropes are well known to those skilled in the art and include fumed silica, calcium carbonate, carbon black and the like. The thixotrope may be added to the composition in a sufficient amount to give the desired rheological properties. Preferably, the thixotrope is present in an amount of about 0 percent by weight or greater based on the weight of the adhesive system, preferably about 1 part by weight or greater.

Preferably, the optional thixotrope is present in an amount of about 10 percent by weight or less based on the weight of the adhesive system and more preferably about 2 percent by weight or less. The formulations may further comprise known additives such as heat stabilizers and antioxidants known to the skilled artisan.

The adhesives useful in this invention may be formulated by blending the components together using means well known in the art. Generally, the components are blended in a suitable mixer. Such blending is preferably conducted in an inert atmosphere in the absence of oxygen and atmospheric moisture to prevent premature reaction. It may be advantageous to add plasticizers to the reaction mixture for preparing the isocyanate containing component so that such mixtures may be easily mixed and handled. Alternatively, the plasticizers can be added during blending of all the components. Preferably, the components are blended at a temperature of about 20° C. to about 100° C., more preferably about 25° C. to about 70° C. Preferably, the materials are blended under vacuum or an inert gas, such as nitrogen or argon. The ingredients are blended for a sufficient time to prepare a well blended mixture, preferably from about 10 to about 60 minutes. Once the parts of the adhesive composition are formulated, they are packaged in a suitable container such that they are protected from atmospheric moisture and oxygen. Contact with atmospheric moisture and oxygen could result in premature crosslinking of the isocyanate containing component.

In one embodiment, the adhesive composition used in the invention comprises a organic polymer having hydrolyzable siloxane functional groups (silane moieties capable of silanol condensation) as described in Mahdi, U.S. Pat. No. 6,828,403, incorporated herein by reference. Preferably, such composition contains a polymer having a flexible backbone and having hydrolyzable siloxane functional groups (silane moieties capable of silanol condensation). The polymer with a flexible backbone can be any polymer with a flexible backbone which can be functionalized with hydrolyzable siloxane functional groups (silanes capable of silanol condensation). Among preferred polymer backbones are polyethers, polyurethanes, polyolefins and the like. Among more preferred polymer backbones are the polyethers and polyurethanes, with the most preferred being the polyethers. Even more preferably, the polymer is a polyether having silane moieties capable of silanol condensation. In one embodiment, the polymer useful in the invention is a polymer as disclosed in Yukimoto et al., U.S. Pat. No. 4,906,707; Iwakiri et al., U.S. Pat. No. 5,342,914; Yukimoto U.S. Pat. No. 5,063,270; Yukimoto et al., U.S. Pat. No. 5,011,900; Suzuki et al., U.S. Pat. No. 5,650,467, all incorporated herein by reference. More preferably such polymers are oxyalkylene polymers containing at least one reactive silicon group per molecule. The terminology "hydrolyzable siloxane functional groups", "reactive silicon group" or "reactive silane capable of silanol condensation" means a silicon-containing group in which a hydrolyzable group or a hydroxyl group is bonded to the silicon atom and which is cross-linkable through silanol condensation reaction. The hydrolyzable group is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxygroup, a mercapto group, and an alkenyloxy group. An alkoxy group, is more preferred with a methoxy or ethoxy group being most preferred, for ease in handling due to their mild hydrolyzability. In one embodiment, the flexible polymer used in the adhesive composition is a silyl terminated prepolymer prepared by contacting a polyol as described herein with an isocyanato silane having at least one silane moiety which has bonded thereto a hydrolyzable moiety under conditions such that the hydroxyl moieties of the polyol react with the isocyanate moieties of the isocyanatosilane so as to place a terminal silane moiety on the polyol, preferably the contacting is performed without addition of catalyst. In another embodiment, the polymer may be a polyurethane based backbone having hydrolyzable silane groups. Such materials are disclosed in Chang, U.S. Pat. No. 4,622,369 and Pohl, U.S. Pat. No. 4,645,816, relevant portions incorporated herein by reference. In another embodiment, the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation. The silicon compound can be added to the polymer at the point of unsaturation by a hydrosilylation reaction. This reaction is described in Kawakubo, U.S. Pat. No. 4,788,254, column 12, lines 38 to 61; U.S. Pat. Nos. 3,971,751; 5,223,597; 4,923,927; 5,409,995 and 5,567,833, incorporated herein by reference. The polymer prepared can be crosslinked in the presence of a hydrosilylation crosslinking agent and hydrosilylation catalyst as described in U.S. Pat. No. 5,567,833 at column 17, lines 31 to 57, and U.S. Pat. No. 5,409,995, incorporated herein by reference.

The prepolymer having hydrolyzable siloxane functional groups is present in the adhesive composition in a sufficient amount such that the adhesive is capable of bonding to a substrate such as glass, metal, plastic, a composite or fiberglass. Preferably, the prepolymer having hydrolyzable siloxane functional groups is present in an amount of about 30 percent by weight or greater based on the weight of the adhesive, more preferably about 40 percent by weight or greater, even more preferably about 45 percent by weight or greater and most preferably about 50 percent by weight or greater. More preferably, the prepolymer is present in an amount of about 99 percent by weight or less based on the weight of the adhesive and most preferably about 85 percent by weight or less. The adhesive composition containing siloxy functional groups further comprises one or more catalysts known to one skilled in the art which catalyzes the silanol condensation reaction as described hereinbefore and in U.S. 2002/0100550, paragraph [0042], incorporated herein by reference. The amount of catalyst in the adhesive formulation is preferably about 0.01 percent by weight or greater, more preferably about 0.1 percent by weight or greater, and most preferably about 0.2 percent by weight or greater, and preferably about 5 percent by weight or less, even more preferably about 1.0 percent by weight or less, even more preferably 0.5 percent by weight or less and most preferably about 0.4 percent by weight or less. The adhesive composition may further comprise a hydrolyzable silicon compound as described in U.S. Publication 2002/0100550, paragraphs [43-47]. The hydrolyzable silicon compound is used in an amount of from about 0.01 to about 20 parts by weight, and preferably from about 0.1 to about 10 parts by weight, per 100 parts by weight of the flexible polymer having a reactive silicon group and capable of crosslinking on siloxane bond formation. Further examples of such hydrolyzable silicone compounds capable of crosslinking the silicone reactive polymer are disclosed in U.S. Pat. No. 5,541,266, incorporated herein by reference. Other such potential additives include organic silicone compounds B as disclosed in U.S. Pat. No. 4,837,274, see column 7, line 12 to column 9, line 15, incorporated herein by reference. In a two-part composition, the hydrolyzable silicon compound and typically the catalyst are found in a second part separate from the silane functional prepolymer. Other adjuvants as described for isocyanate functional adhesive compositions may be added to the prepolymer having hydrolyzable siloxane functional groups.

In use, the components of two-part adhesive compositions are blended as would normally be done when working with such materials. For a two-part adhesive to be most easily used in commercial and industrial environments, the volume ratio at which the two parts are combined should be a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. Typically, these dispensers use a pair of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable composition is extruded from the mixing chamber onto a substrate. When using electrically-driven equipment, dynamic mixing may be used. Once the tubes have been emptied, they can be replaced with fresh tubes and the application process continued. The volumetric ratio at which the two parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two parts of the polymerizable composition at a convenient mix ratio. Some common mix ratios are 1:1, 2:1, 4:1 and 10:1. Preferably, the two parts are blended at a mix ratio of about 1:1.

Preferably, the mixed two-part compositions of the invention have a suitable viscosity to allow application without dripping. Preferably, the viscosities of the two individual components should be of the same order of magnitude. Preferably, for compositions mixed utilizing static mixing, the components prior to cure have a viscosity of about 10 Pa·S (10,000 centipoises) or greater, more preferably about 20 Pa·S (20,000 centipoises) or greater and most preferably about 40 Pa·S (40,000 centipoises) or greater. Preferably, the two parts of the compositions have a viscosity prior to contacting of about 150 Pa·S (150,000 centipoises) or less, more preferably about 120 Pa·S (120,000 centipoises) or less and most preferably about 100 Pa·S (100,000 centipoises) or less. "Viscosities" as used in this passage are determined at a shear rate of 20 reciprocal second measured with a cone plate rheometer of 20 mm diameter and 4° angle. Higher viscosities require dynamic mixing. For lower viscosities, the components may require gelling agent known in the art to prevent sag of the uncured adhesive system.

The catalyst used in the inventive system and process is dissolved in or dispersed in the solvent or dispersant utilizing standard blending techniques known to one skilled in the art. It is preferable to produce the catalyst solution or dispersion under a controlled atmosphere, for instance, in an inert gas environment.

The process of the invention is used to bond a variety of substrates together as described hereinbefore. The process can be used to bond porous and nonporous substrates together. The catalyst solution or dispersion is contacted with the substrate surface which is to be bonded by an adhesive. This contacting can be performed manually or with the use of a robotic applicator. The catalyst solution or dispersion can be applied by means of a spray applicator, brush, roller or by wiping it on to the surface. Robotic and manual equipment for such applications are well known to one skilled in the art. The solvent is allowed to volatilize away. Preferably, the time period from application of the catalyst solution or dispersion to application of the adhesive to the substrate is about 0.5 minutes or greater, more preferably about 2.0 minutes or greater and most preferably about 5.0 minutes or greater. Preferably, the time period from application of the catalyst solution or dispersion to application of the adhesive to the substrate is about 300 minutes or less, more preferably about 60 minutes or less and most preferably about 30 minutes or less. After the solvent volatilizes away, it is preferable that only the catalyst remain on the surface of the substrate to be bonded. In one embodiment, the treated surface of the substrate may have the catalyst and a marker used to identify that the treatment has taken place. Alternatively, a process step of using a vision system can be used to insure the catalyst solution or dispersion was applied. This can involve either exposing the substrate to a light source that causes the marker to be visible or can be a thermal imaging system that identifies a temperature change due to evaporation of the solvent. Thereafter, the adhesive is contacted with the substrates.

The adhesive composition is applied to a first substrate at the location wherein the catalyst solution or dispersion was previously applied and the adhesive composition on the first substrate is thereafter contacted with a second substrate. In one embodiment, the first substrate is bonded to a second substrate with the adhesive disposed between the two substrates before the reactive adhesive is cured. In another embodiment, the second substrate is treated with the catalyst in a volatile solvent or dispersant on the portion of the surface to be contacted with the reactive adhesive. The catalyst solution or dispersion can be applied to one of more of the substrates prior to the time the adhesive is applied to each substrate. Generally, the adhesive is applied at a temperature at which the adhesive can be pumped. Preferably, the adhesive is applied at a temperature of about 10° C. or greater for application, more preferably at a temperature of about 18° C. or greater. Preferably, the polymerizable adhesive system is applied at a temperature of about 40° C. or less and more preferably at a temperature of about 35° C. or less. Two-part adhesive compositions start to cure upon mixing the two parts. One-part moisture curable compositions begin to cure upon exposure to ambient moisture. One-part latent curing adhesives begin cure upon exposure to the activation temperature of the catalyst. Curing can be accelerated by applying heat to the curing adhesive by means of induction heat, convection heat, microwave heating and the like. The invented process is especially useful when heat acceleration is utilized. For moisture curable adhesives, the speed of cure can be enhanced by addition of moisture to the atmosphere or by performing the cure in a humidity chamber. Preferably, the curable adhesive system is formulated to provide an open time of at least about 3 minutes or greater and more preferably about 5 minutes or greater. "Open time" is understood to mean the time after contacting the two parts, application of a one-part moisture cure adhesive, or activation of the latent catalyst in a one-part adhesive containing a latent catalyst, until the adhesive starts to become a high viscous paste and is not subject to deformation during assembly to conform to the shape of the second substrate and to adhere to it.

The process of the invention is preferably used to bond metal, coated metal (with e-coat or a paint system), plastic, fiber reinforced plastic, wood and/or glass together. In another embodiment, the compositions of the invention can be used to bond modular components to a car body or to each other. Examples of modular components include vehicle modules, such as a door, window, roof module or body. The process of the invention can be also used to bond exterior or interior trim to automobile bodies.

The process of the invention allows the adhesive composition to be capable of bonding to certain substrates in the absence of a primer or of any other treatment of the surface of the substrate, except application of the catalyst solution or dispersion. Examples of substrates which the adhesive composition bonds to without the need for primer or surface treatment include sheet molding compound (SMC), fiber reinforced plastics, such as polyester, and coated metals, e.g., e-coated aluminum and steel and painted metal sheets.

The adhesive systems used in the invention preferably exhibit adequate green strength to hold substrates together without moving with respect to one another without the application of force to one of the substrates after about 60 minutes, more preferably after about 40 minutes and most preferably after about 20 minutes. The adhesive systems applied utilizing the process of the invention preferably exhibit full cure after about 7 days, more preferably after about 16 hours and most preferably after about 12 hours. The polymerizable adhesive system preferably exhibits a tensile strength after complete cure of about 5 MPa or greater, more preferably about 10 MPa or greater and most preferably about 15 MPa or greater. The polymerizable adhesive system preferably exhibits a lap shear strength after complete cure of about 5 MPa or greater, more preferably about 10 MPa or greater and most preferably about 15 MPa or greater, wherein the lap shear strength is determined according to DIN 53283.

Molecular weights as described herein are number average molecular weights which may be determined by Gel Permeation Chromatography (also referred to as SEC). For polyurethane prepolymers, it is also possible to calculate approximate number average molecular weight from the equivalent ratio of the isocyanate compounds and of the polyol compounds with which they are reacted as known to the persons skilled in the art. Unless otherwise stated all parts and percentages are by weight and based upon the weight of the adhesive system.

ILLUSTRATIVE EMBODIMENTS OF THE INVENTION

The following examples are provided to illustrate the invention, but are not intended to limit the scope thereof.

Examples 1 to 7

Lap shear type samples of e-coated steel 100×45×1 mm as one substrate and e-coated aluminum 100×45×1 mm as the other substrate are used. Before the application of the adhesive, the contact surface of the substrates are treated by n-Heptane or catalyst solutions of the invention as described in Table 1. The lap shear samples are prepared with an overlap of 10 mm by applying the adhesive onto the substrates which are then placed in a jig so that the adhesive height is 2 mm. The excess adhesive is cleaned off. The jig with the lap shear sample is placed into the induction equipment (IFF EW2 or IFF EW5). The sample is heated on the aluminum side only by induction up to 80 percent of the desired temperature with 10 kHz. This takes about 30 seconds. The frequency is then changed to 20 kHz to maintain the desired temperature for additional 30 seconds. Then the lap shear sample is placed immediately in an Instron testing machine and the lap shear strength recorded as the strength at break. The failure mode is also recorded as adhesive failure (AF, failure of the adhesive bond to the substrate), cohesive failure (CF, the adhesive breaks internally) and boundary failure (BF, adhesive breaks at the interface leaving a residue on the surface of the substrate). The adhesive is a two-part adhesive comprising a polyisocyanate prepolymer in one part and in the other part a polyether polyol based curing agent available from The Dow Chemical Company under the trademark and designation BETASEAL 2850s. The results are compiled in Table 1.

TABLE 1

| Ex | Surface Treatment | Temp° C. | Lap shear MPa | Failure-mode | Remarks |
|---|---|---|---|---|---|
| 1 | n-Heptane | 80 | 0.00 | 100AF | no wetting |
| 2 | n-Heptane | 120 | 0.00 | 100AF | no wetting |
| 3 | BETAPRIME ™ 1709 primer | 80 | 0.00 | 100AF | slightly wetting |
| 4 | BETAPRIME ™ 1709 primer | 120 | 0.00 | 100AF | slightly wetting |
| 5 | BETAWIPE ™ 04604 wipe | 80 | 0.00 | 100BF | |
| 6 | BETAWIPE ™ 04604 wipe | 120 | 0.03 | 100AF | slightly wetting |
| 7 | BETAWIPE ™ 6700 wipe | 120 | 0.09 | 100BF | |
| 8 | Dibutyl tin dilaurate 1%, in n-Heptane | 80 | 0.22 | 50CF | failure close to surface |
| 9 | Dibutyl tin dilaurate 1%, in n-Heptane | 100 | 0.40 | 100CF | failure close to surface |
| 10 | Dibutyl tin dilaurate 1%, in n-Heptane | 120 | 0.20 | 100CF | failure close to surface |
| 11 | titanium acetylacetonate, 1% in n-Heptane | 120 | 0.40 | 100CF | failure close to surface |
| 12 | 1,8-diazabicyclo (5,4,0) undecene-7, 1% in n-Heptane | 120 | 0.14 | 100BF | |
| 13 | Tris-(dimethylaminomethyl) phenol 0.9% in n-Heptane | 100 | 0.23 | 100CF | |
| 14 | Tris-(dimethylaminomethyl) phenol 0.9% in n-Heptane | 120 | 1.25 | 100CF | |

Examples 15 to 23

Plastic substrates are tested as described above. The plastic substrates tested are Sheet Molding Compound, SMC, (Polyester), Polycarbonate-Polybutylene Terephthalate-Blend, PCPBT, and Ethylene-Propylene Diene-Monomer Rubber, EPDM. The substrates are treated as before with n-Heptane or Tris-(dimethylaminomethyl)phenol 0.9 percent in n-Heptane. Adhesion tests samples are prepared by applying a bead of about 8 mm onto the substrate. The adhesive is flattened to a height of 5 mm. The test samples are cured at RT for 7 days and Examples 18 and 22 are additionally aged under Cataplasma conditions (7 days at 23° C. and 50 percent relative humidity, then 7 days at 70° C. and 100 percent relative humidity and 16 hours at −20° C. and 2 hours reconditioning to ambient temperature). The adhesive is peeled off and the failure mode determined. The results are compiled in Table 2.

TABLE 2

| Ex | Surface Treatment | Sub-strate | Cure condition °C. | Failure mode |
|---|---|---|---|---|
| 16 | n-Heptane | SMC | 23 | 100AF |
| 17 | n-Heptane | PCPBT | 23 | 100AF |
| 18 | n-Heptane | PCPBT | Cat | 100AF |
| 19 | n-Heptane | EPDM | 23 | 100AF |
| 20 | n-Heptane | SMC | 23 | 100CF |
| 21 | Tris(dimethylaminomethyl)phenol 0.9% in heptane | PCPBT | 23 | 100CF |
| 22 | Tris(dimethylaminomethyl)phenol 0.9% in heptane | PCPBT | Cat | 100CF |
| 23 | Tris(dimethylaminomethyl)phenol 0.9% in heptane | EPDM | 23 | 100CF |

Examples 24 to 33

Lap shear samples are treated by n-Heptane or 2,4,6-tris (dimethyl amino methyl) phenol (0.9% in n-Heptane) prior to application of the adhesive. Lap shear samples used are e-coated steel 100×25×1.5 mm and e-coated and painted (1K Monohydrocoat 9147, artic white from PPG) steel 100×100× 1.5 mm substrate are prepared. The overlap is 9 mm and the adhesive height is 5 mm. The adhesive used is BETASEAL™ 1841, one-part moisture curing isocyanate functional adhesive available from Dow Europe GmbH is applied with at a temperature of 60° C. onto the surface coated with a commercial basecoat. The adhesive width is restricted by adhesive tapes. The tests are carried out according to following time line.

| Time | Operation |
|---|---|
| 0 | application of adhesive, start cooling |
| +40 sec | end cooling phase |
| +20 sec. | removal of the adhesive tape |
| +30 sec | Test specimen fixed in vertical position |
| +50 sec | Weight load 134 g (incl. substrate) applied |
| +10 min | Sag/Sliding measured |

The test plaques are oriented in a vertical fashion after application of the adhesive and the distance the adhesive slide is measured in millimeters. The results are compiled in Table 3.

TABLE 3

| Example | Treatment | Sag, mm |
|---|---|---|
| 24 | n-Heptane | 0.88 |
| 25 | n-Heptane | 1.09 |
| 26 | n-Heptane | 1.08 |
| 27 | n-Heptane | 0.45 |
| 29 | n-Heptane | 0.87 |
| 30 | n-Heptane | 0.78 |
| 31 | Tris-(dimethylaminomethyl)phenol, 0.9% in n-Heptane | 0.0 |
| 32 | Tris-(dimethylaminomethyl)phenol, 0.9% in n-Heptane | 0.0 |
| 33 | Tris-(dimethylaminomethyl)phenol, 0.9% in n-Heptane | 0.0 |

What is claimed is:

1. A method of bonding a reactive adhesive to at least one substrate comprising:
    a) contacting a tertiary amine catalyst for a curing of a polyisocyanate based adhesive system in a volatile hydrocarbon solvent or dispersant with the surface of the substrate comprising a coated metal to which the polyisocyanate based adhesive system will be bonded;
    b) allowing the volatile hydrocarbon solvent or dispersant to volatilize away;
    c) contacting a reactive polyisocyanate based adhesive system with the surface treated in step a); and
    d) allowing the polyisocyanate based adhesive system to cure.

2. A method according to claim 1 wherein the first substrate is bonded to a second substrate with the adhesive disposed between the two substrates before the reactive adhesive is cured.

3. A method according to claim 1 wherein the second substrate is treated with the catalyst in a volatile solvent or dispersant on the portion of the surface to be contacted with the reactive adhesive.

4. A method according to claim 1 wherein the adhesive is a one-part or two-part polyisocyanate based adhesive system.

5. A method according to claim 1, wherein the volatile solvent is one or more of an aliphatic hydrocarbon, cycloaliphatic hydrocarbon, or aromatic hydrocarbon.

6. A method according to claim 5 wherein the concentration of catalyst in volatile solvent or dispersant is from about 0.01 to about 20 percent by weight.

7. A method according to claim 1 wherein after step b) only catalyst is located on the surface of the substrate to which the adhesive is to be bonded.

8. A method according to claim 1 wherein the catalyst solution further comprises a marker.

9. A method according to claim 8 wherein after step b) only catalyst and marker are located on the surface of the substrate to which the adhesive is to be bonded.

10. A method according to claim 1 wherein the catalyst solution does not contain a film forming resin.

11. A method according to claim 1 wherein the substrate comprises e-coated metal.

12. A method according to claim 11 wherein the e-coated metal is aluminum or steel.

13. A method according, to claim 1 wherein the reactive adhesive on the substrate is heated.

14. A method according to claim 13 wherein the reactive adhesive on the substrate is heated from 60° C. to 180° C.

15. A method of bonding a reactive adhesive to at least one substrate comprising:
    a) contacting a catalyst comprising tris-(dimethylaminomethyl) in a volatile hydrocarbon solvent or dispersant with the surface of the substrate to which the polyisocyanate adhesive system will be bonded;
    b) allowing the volatile solvent or dispersant to volatilize away;
    c) contacting it reactive polyisocyanate adhesive system with the surface treated in step a); and
    d) allowing the polyisocyanate adhesive system to cure.

16. A method according to claim 15 wherein the first substrate is bonded to a second substrate with the adhesive disposed between the two substrates before the reactive adhesive is cured.

17. A method according to claim 15 wherein the second substrate is treated with the catalyst in a volatile solvent or dispersant on the portion of the surface to be contacted with the reactive adhesive.

18. A method according to claim 15 wherein the adhesive is a one-part or two-part polyisocyanate based adhesive system.

19. A method according to claim 15 wherein the volatile solvent is one or more of an aliphatic hydrocarbon, cycloaliphatic hydrocarbon, or aromatic hydrocarbon.

20. A method according to claim 19 wherein the concentration of catalyst in volatile solvent or dispersant is from about 0.01 to about 20 percent by weight.

21. A method according to claim 15 wherein after step b) only catalyst is located on the surface of the substrate to which the adhesive is to be bonded.

22. A method according to claim 15 wherein the catalyst solution further comprises a marker.

23. A method according to claim 22 wherein after step b) only catalyst and marker are located on the surface of the substrate to which the adhesive is to be bonded.

24. A method according to claim 15 wherein the catalyst solution does not contain as film forming resin.

25. A method according to claim 15 wherein the substrate comprises coated metal.

26. A method according to claim 25 wherein the substrate comprises e-coated metal.

27. A method according to claim 26 wherein the e-coated metal is aluminum or steel.

28. A method according to claim 15 wherein the reactive adhesive on the substrate is heated.

29. A method according to claim 28 wherein the reactive adhesive on the substrate is heated from 60° C. to 180° C.

* * * * *